May 24, 1955 H. K. SHONTS 2,708,866
ROTARY CULTIVATOR
Filed April 30, 1952 2 Sheets-Sheet 1
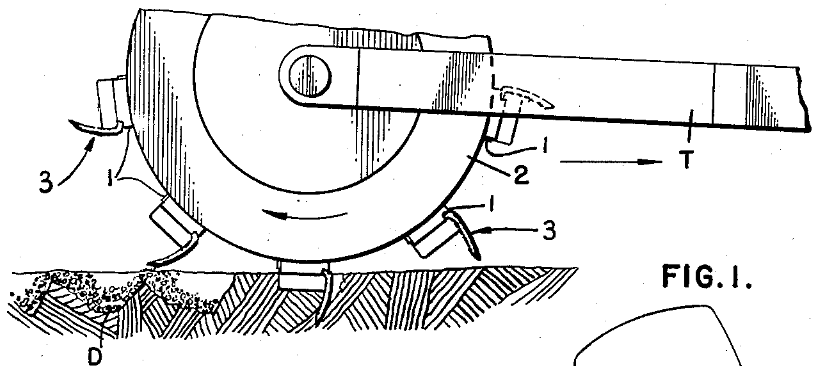
FIG. I.
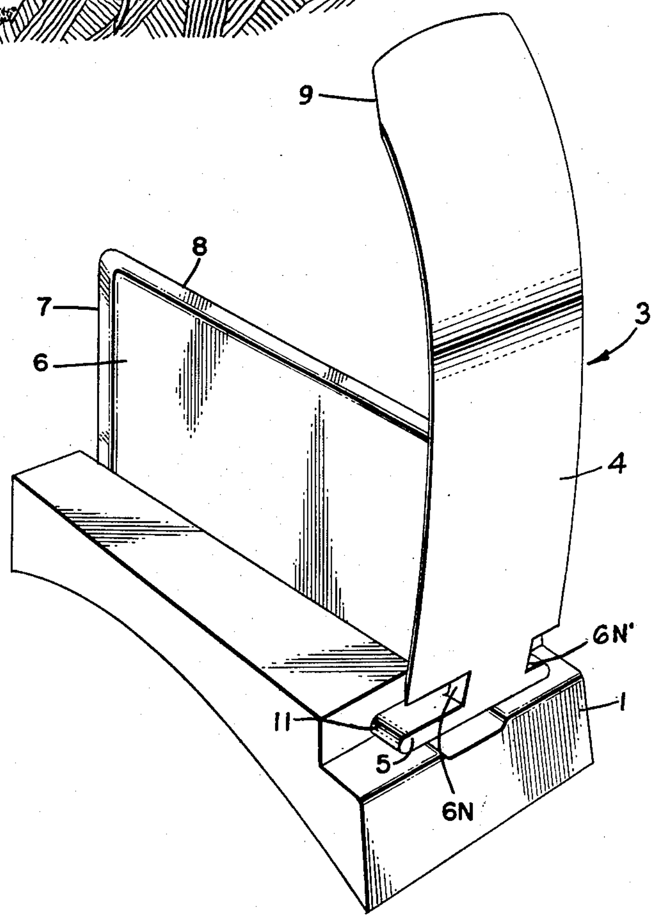
FIG. 2.
INVENTOR
HOMER K. SHONTS
BY Franklin S. Long
ATTORNEY

ROTARY CULTIVATOR

Filed April 30, 1952

INVENTOR
HOMER K. SHONTS
BY Franklin S. Long
ATTORNEY

United States Patent Office 2,708,866

Patented May 24, 1955

2,708,866

ROTARY CULTIVATOR

Homer K. Shonts, Lockport, Ill., assignor, by decree of distribution, to Jessie Shonts Application April 30, 1952, Serial No. 285,130

10 Claims. (Cl. 97—215)

This invention relates specifically to a combination cutter-tooth to be used on a rotary tiller agricultural implement.

The implement contemplated is a rotary tiller of the soil equivalent to a plow, since it cultivates or loosens all of the top soil but does not leave any regular furrows and ridges such as are left by an ordinary plow or plows. On the contrary the implement leaves the top soil in a uniformly tilled condition having irregular depressions or crevices, to prevent or, at least, retard erosion. With the use of this soil tiller implement there is no need for, so called, "contour farming."

It is contemplated that the teeth and their cutters located on the drum or wheel will be sufficiently close to each other to stir up or loosen all of the top soil.

This treatment of the soil provides for the collection of water in the depressions or crevices, when it rains and retains it so that the water can saturate a portion, at least, of the soil and prevent the water from flowing freely to a lower level and carrying soil with it.

Further objects of my invention will be revealed in the particular description of my invention given in connection with the accompanying drawings which constitute a part of my application.

In the drawings:

Fig. 1 is a fragmentary side elevation showing a portion of a drum having a series of teeth secured thereon.

Fig. 2 is a perspective view of a tooth and its connecting block, base or shoe, whereby the tooth may be attached to a drum or wheel.

Figure 3:
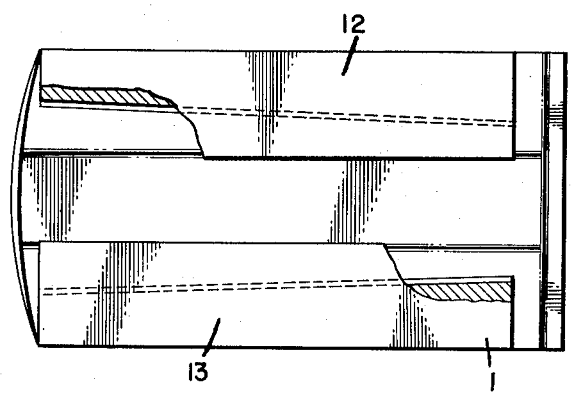
Fig. 3 is a plan view of the block or shoe with portions of the same broken away for the sake of clearness in detail.

My invention comprises a combined tooth, cutter and shoe construction, constituting a detachably united unit of two principal parts. The shoe 1 is adapted to be welded to the drum or wheel 2. The shoes 1 including the teeth are suitably distributed in spaced relation as indicated, generally, in Fig. 1. The teeth 4 can be nine inches long more or less and should be sufficiently spaced, but in close relation so that the top soil is all loosened or tilled. The drum or wheel 2 may be twenty-four inches in diameter and thirty-six inches long. Each drum 2 may have thereon forty-five teeth i. e. five rows of teeth having nine in each row. When one such drum has treated one acre of ground it will have penetrated the ground or soil approximately 87,000 times. One tooth 4 to every nine linear inches breaks up all of the ground but still leaves 87,000 deep indentations or pockets D in the subsoil to receive and retain water from heavy rains or a heavy supply of water from melted ice or snow. These deep indentations facilitate the retention of water so that it can penetrate and saturate the subsoil and consequently retard erosion.

Figure 8:
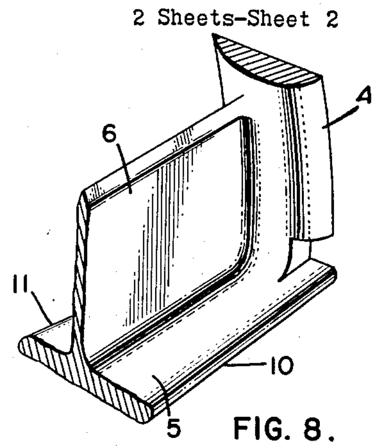
Fig. 8 is a fragmentary perspective view showing the cutting blade as cast or forged with the tooth and its base to constitute an integral construction.
Figure 5:
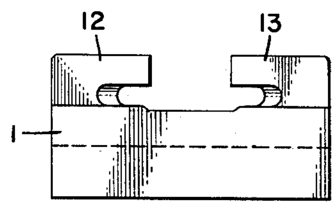
Fig. 5 is an end elevation of the front end of a shoe.
Figure 4:
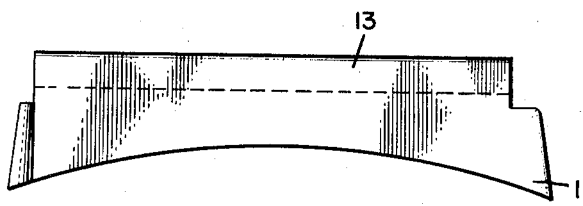
Fig. 4 is a side elevation of a shoe showing how the tooth may be attached to the drum.
Figure 7:
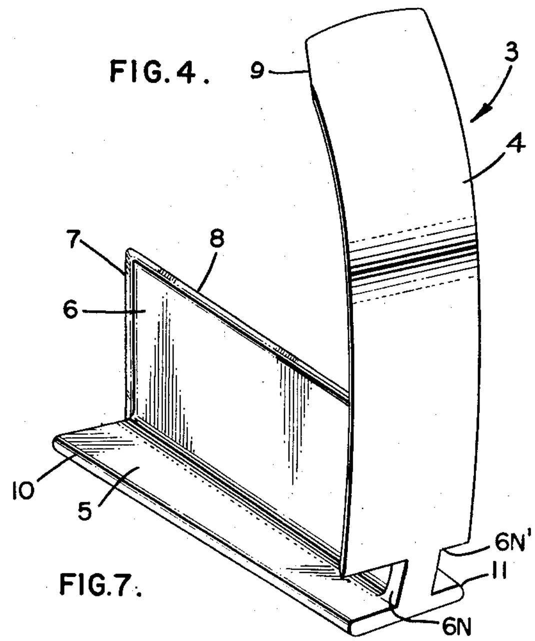
Fig. 7 is a perspective view of the complete tooth and cutter blade construction.

One part of unit construction 3 comprises a tooth 4 having its major forward portion transversely convex as clearly shown in Fig. 8. The tooth 4 is provided with a base 5 having convergent edge portions 10 and 11 complemental to the convergent outer edge portions of the channel portion in the shoe 1. The channel portion is flanked by parallel flanges 12 and 13. The channel portion as cast or forged is provided with a longitudinal recess centrally located in the bottom portion thereof. This recess facilitates the machining of the convergent edge portions of the channel, provided, such machining is found necessary. The outer surface portions of the flanges 12 and 13 and the inner surface portions are preferably and, respectively, coplanar with each other. Since, the narrow end of the base 5 is opposite the tooth 4; the tooth 4 must be cut away or provided with recesses as indicated at 6N and 6N' as shown in Figs. 2 and 7.

The blade 6 is forged or cast integral with the tooth 4 and its base 5 as clearly shown in Fig. 8. The blade 6 is provided with cutting edges 7 and 8 for cutting weeds and the like located in its descending path.

Figure 6:
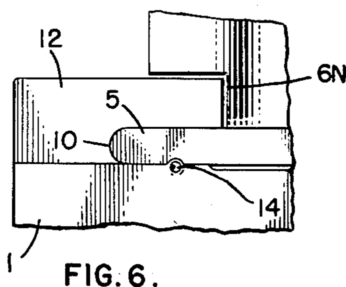
Fig. 6 is a fragmentary front elevation of a shoe with the tooth therein and depicting a punched portion to retain the tooth within the shoe against accidental removal.

The part 3 construction, tooth 4 and its base 5 and cutter blade 6 are fitted to the shoe 1 or other part by a relative sliding movement and the base 5 is or may be driven into a wedging engagement with the convergent channel portions of the shoe 1. In order, to prevent accidental displacement of the part 3 from the shoe 1 a portion of the shoe may be upset as by a center punch as indicated at 14 of Fig. 6. When it is desired to remove the part 3, the upset portion at 14 may be reduced by a file or hacksaw if found desirable. The terminal outer end of the tooth 4 may be beveled and sharpened as indicated at 9 in Figs. 2 and 7. The tooth 4 may vary in width from one inch to two and one-half inches and may be nine inches in length. The dimentions of the tooth 4 appears to be purely a matter of choice or selection and, of course, will be dictated according to estimated requirements.

In operation the series of teeth 4 on the drum 2 will successively cut and sink into the soil, land or earth, till the soil and form deep indentations or pockets D in the subsoil. The tillage prevents the formation of regular furrows and ridges but on the contrary leaves the tilled soil supplied with irregular indentations or crevices tending to prevent the formation of streams of water but on the other hand tends to retain the water so that it can soak into or penetrate the soil. Likewise, the subsoil pockets also tend to retain the water and provide for its desirable penetration of the contiguous earth or soil.

The transversely convexed portion of the tooth 4 aids in parting the cut soil so that the soil on tooth 4 can be readily thrown off laterally from the blade 6 and away from the tooth 4. It is contemplated that substantially no soil will cling to the tooth 4 or any other portion of the unit.

When desired the whole tooth construction can be removed from its shoe by suitable applied pressure or successive impacts of a hammer. If the punched up portion at 14 in the path of the base 5 appears to be quite extensive, it may be removed by a cold-chisel or any other suitable means, such as a file or hacksaw.

The tapered channel portion may be machine finished, if necessary for accuracy and smoothness.

The tooth 4 and cutting blade 6 are made of any suitable steel and the tapered portions 10 and 11 may be machine finished to fit accurately into the tapered channel portion of the shoe 1.

The cutting edges 7 and 8 of blade 6 are arranged in a plane parallel to the forward movement of the agricultural implement. The cutting edges define a pointed tip which enters the soil with the tip in advance and cuts in two directions through weeds, stubble, etc., lying in the path of the blade 6, just as in, so called, "stubble mulch farming." Cutting the weeds, stubble, etc., in advance of the tooth 4, prevents or, at least, reduces the chances of clogging or dragging the weeds and stubble, etc., around with and over the revolving drum 2.

Since good farm land is not even and level but on the contrary is rolling, defining hills and valleys, it is not unusual that the inclines or slopes of the hillsides are quite pronounced or rather steep so that when it rains there is a tendency for the water to gather in small streams or rivulets and thereby cause detrimental erosion which should be prevented or, at least, retarded as much as possible.

With the subsoil pockets D made in the sloping land by my machine, it is self evident, that a great deal of the rain will be retained in the pockets and erosion of the land will, at least, be retarded. Furthermore, the water retained or collected in the pockets will soak into land just where it is needed most. Because of the pockets and the irregular surface of the tilled soil the exposed surface area is considerably increased. This increase of irregular surface area also contributes to the desired result, i. e. more water is retained where it is usually needed most and erosion is, at least, retarded even if not entirely prevented.

Having fully disclosed my invention, what I claim is:

1. In a rotary metallic drum agricultural implement in combination with tilling, digging and cutting units secured in suitably spaced relation on the outer circumference of said drum; the substructure comprising a single metallic two part unit, one of said parts comprising a shoe substantially rectangular in external contour and being substantially rectangular in cross section both longitudinally and transversely, one side portion of said shoe being longitudinally curved inwardly and complemental to the outer circumference of said metallic drum whereby said shoe may be securely welded to said drum, the opposite portion of said shoe having a tapered channel portion therein extending longitudinally thereof, said channel portion having flanges thereon extending toward each other and terminating in suitably spaced relation, said shoe and its channel portion adapted to extend at substantially a right angle to the axis of said drum, said other part of said two part unit comprising a combined tooth and cutter blade integrally united, said tooth having a tapered base of uniform thickness and being complemental to said tapered channel portion of said shoe whereby said two parts may be detachably united, said tooth and its base substantially defining a right angle and containing the cutting blade therein at a right angle to said base and longitudinally and medially thereof, said blade having cutting edges thereon at substantially a right angle to each other and defining a penetrating point, whereby said blade can cut in opposite directions simultaneously the inner portion of said tooth being convex throughout its major portion to facilitate lateral throw of the cut soil from the tooth and blade.

2. The construction set forth in claim 1, in which the tooth has oppositely disposed recesses at the narrow end of its tapered base whereby said combined tooth and blade may be inserted tooth foremost into the tapered channel portion of said shoe.

3. In an agricultural implement comprising a soil supported metallic roller drum, a digging tiller unit secured to said drum, said unit comprising two parts detachably assembled, one of said parts comprising a shoe having on its inner side an arcuate surface portion complemental to the outer circumference of said drum whereby said shoe may be securely welded to the outer circumference of said drum, the outer side of said shoe being provided with a longitudinally disposed channel portion, said channel being located in a position substantially at a right angle to the axis of the drum, said channel portion being tapered convergingly from its entrance to its opposite end, said channel portion defining opposed flanges projecting toward each other and terminating in suitably spaced relation, in combination with a second part comprising a tooth, a tooth construction and a cutter blade, said tooth construction having a flat base of substantially uniform thickness, said tooth being slightly arcuate in contour and extending outwardly from one end of said base, said cutter blade being cast with said base and tooth along an intermediate longitudinal portion thereof and extending outwardly at substantially a right angle to said base, the inner portion of said tooth adjacent said blade being convex, said base having convergent side edges complemental to the convergent portions of the channel portion of said shoe and fitted therein.

4. The construction set forth in claim 3, in which said shoe is made of cast steel whereby it may be distorted to provide a hump in the broad end of the channel portion in the path of the base to prevent accidental removal of said tooth construction from the shoe.

5. In an agricultural implement comprising a soil supported metallic roller drum, a digging tiller unit, said unit comprising two parts detachably assembled, one of said parts comprising a shoe of substantially rectangular construction in section both longitudinally and transversely, one side of said shoe having a surface portion whereby it may be securely welded to the metallic drum, the opposite portion being provided with a longitudinally disposed tapered channel defining a tapered socket portion, said socket portion being substantially at a right angle to the axis of said drum, said socket portion having flanges arranged in opposed relation to each other and terminating in substantially parallel spaced relation, in combination with the second part comprising a tooth construction, a tooth and a cutter blade, said tooth construction having a flat base substantially of uniform thickness integral with said tooth, said tooth being on one end of said base and extending outwardly therefrom, said base portion and said tooth being substantially equal in length, said cutter blade being of substantially uniform thickness and cast with said base and tooth along a longitudinal intermediate portion thereof and extending outwardly at substantially a right angle to said base, said base being longitudinally tapered complemental to said tapered portion of said channel portion of said shoe.

6. The construction set forth in claim 5, in which the cutter blade, the base portion and the tooth define at their juncture substantially a right angle at the narrow end of the base portion, said tooth having an opposed pair of recesses therein at the narrow end of said base portion whereby said flanges may be received by said recesses when said tooth construction is being assembled on said shoe.

7. The construction set forth in claim 5 in which the cutter blade, the base portion and the tooth define at their juncture substantially a right angle at the narrow end of the base portion, said cutter blade having two exposed sharpened edges arranged at substantially a right angle to each other, the free end of said tooth being beveled to produce a sharpened edge.

8. In a soil tiller construction, the substructure comprising a combined soil penetrating tooth and a cutter blade integral therewith, said tooth having a flat base substantially at a right angle thereto at one end thereof, said tooth being slightly arcuate to extend forwardly, said cutter blade being located in the angle between the base and its tooth, said cutter blade having cutting edges arranged substantially at a right angle to each other and defining a penetrating tip whereby said blade being double edged cuts simultaneously in opposite directions, the forward portion of the tooth adjacent to and contiguous with the cutting blade being transversely convex whereby the cut soil is parted and thrown off laterally from the blade and the tooth.

9. In a rotary metallic drum agricultural implement in combination with a combined tooth and cutter blade unit, means for connecting said unit to said drum comprising a metallic shoe, said shoe having portions thereof lying in an arc complemental to the circumference of said drum whereby said shoe may be securely welded to said drum, the outer side of said shoe spaced from said drum having a tapered channel portion therein with overhanging flanges thereon extending toward each other but terminating in a substantially spaced relation to each other, said unit having a flat base of substantially uniform thickness but being tapered along its edges to be complemental to the tapered channel of said shoe whereby said unit and said shoe may be assembled, said tooth extending outwardly from said base at one end of said base, said cutter blade being located in the angle between said tooth and said base and being permanently secured, respectively, to said base and said tooth, said blade being located along a longitudinal intermediate portion of both said base and tooth.

10. The construction set forth in claim 9, in which said cutter blade is provided with two cutting edges arranged substantially at a right angle to each other and defining substantially a common plane, said tooth having its free end sharpened.

References Cited in the file of this patent

UNITED STATES PATENTS

| | | |
|---|---|---|
| 289,797 | Ball | Dec. 11, 1883 |
| 432,758 | Mills | July 22, 1890 |
| 1,304,375 | Robinet | May 20, 1919 |
| 1,369,745 | Jackson | Feb. 22, 1921 |
| 2,403,078 | Hettelsater | July 2, 1946 |

FOREIGN PATENTS

| | | |
|---|---|---|
| 818,785 | France | June 28, 1937 |